United States Patent
Lu et al.

(10) Patent No.: US 9,679,184 B2
(45) Date of Patent: Jun. 13, 2017

(54) ACOUSTIC WAVE FINGERPRINT RECOGNITION UNIT AND METHOD FOR MANUFACTURING THEREOF

(71) Applicants: Interface Optoelectronics (ShenZhen) Co., Ltd., Shenzhen (CN); General Interface Solution Limited, Miaoli County (TW)

(72) Inventors: Hung-Chieh Lu, Guangdong (CN); Yen-Heng Huang, Guangdong (CN); Chung-Kai Chen, Guangdong (CN); Shih-Chieh Huang, Guangdong (CN); Li-Ting Cheng, Guangdong (CN)

(73) Assignees: INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 127 days.

(21) Appl. No.: 14/729,077

(22) Filed: Jun. 3, 2015

(65) Prior Publication Data
US 2016/0171270 A1    Jun. 16, 2016

(30) Foreign Application Priority Data

Dec. 11, 2014    (CN) .......................... 2014 1 0766656

(51) Int. Cl.
*G06K 9/00*    (2006.01)
*G06F 3/043*    (2006.01)

(52) U.S. Cl.
CPC ........... *G06K 9/0002* (2013.01); *G06F 3/043* (2013.01); *G06F 2203/04103* (2013.01); *G06K 9/00* (2013.01)

(58) Field of Classification Search
CPC .... G06K 9/0002; G06K 9/00; G06K 9/00053; G06F 2203/04103; G06F 3/043; G06F 1/1607; G06F 3/044; G06F 2203/04104; G06F 2203/04106; G06F 3/0338; G06F 3/03547; G06F 1/1626; G06F 1/1684;
(Continued)

(56) References Cited

U.S. PATENT DOCUMENTS 5,238,729 A  *  8/1993  Debe ..................... G01N 27/127
                                                          428/142
5,365,937 A  *  11/1994  Reeves .................. A61B 7/003
                                                          600/528

(Continued)

*Primary Examiner* — Vu Le
*Assistant Examiner* — Aklilu Woldemariam
(74) *Attorney, Agent, or Firm* — CKC & Partners Co., Ltd.

(57) ABSTRACT

The present disclosure provides an acoustic wave fingerprint recognition unit including a sensor circuit substrate, a film adhesive layer positioned on the sensor circuit substrate, a piezoelectric material layer positioned on the film adhesive layer and a protection layer positioned on the piezoelectric material layer. The film adhesive layer is formed of a film adhesive material, and the film adhesive material is composed of a film adhesive agent and an organic solvent. The film adhesive agent is an epoxy resin, and the organic solvent is a C3-C8 and carbonyl-containing organic solvent. The solid content of the film adhesive agent in the film adhesive material is in a range of 1%-90%. A method for manufacturing the acoustic wave fingerprint recognition unit is also provided herein.

13 Claims, 6 Drawing Sheets

(58) Field of Classification Search
CPC .. G06F 21/83; G06F 2203/0338; G06F 3/041; G06F 3/0412; C09J 163/00; C09J 153/00; C09J 2201/28; H01L 21/486; H01L 2224/11462; H01L 2224/81801; H01L 23/60; H01L 24/11; H01L 24/17; H01L 41/09; H01L 27/32; H01L 29/4908; H01L 51/4213; H01L 31/022466; G02B 1/11; G02B 6/0053; Y10T 428/24364; Y10T 428/24388; Y10T 428/24421; Y10T 428/254; Y10T 428/31663; Y10T 428/2495; C08L 2666/02; C08L 53/00; C09D 4/00; C09D 153/00; C09D 5/24; C08F 222/1006; C08F 2/44; H04N 5/65; G03F 7/004; G03F 7/031; H01B 1/22; B32B 2457/208; B32B 7/12; B32B 2457/206; G02F 1/13338; H04M 2250/22; H01M 10/0565; H01M 2/1066; Y02E 10/549; B41J 2/14233; B41M 3/006; B05D 2203/30
USPC .......................... 382/124; 345/161, 173, 174
See application file for complete search history.

(56) References Cited

U.S. PATENT DOCUMENTS

| | | | | |
|---|---|---|---|---|
| 6,733,863 | B1 * | 5/2004 | Mizuno | C09J 7/0246 428/143 |
| 7,015,579 | B2 * | 3/2006 | Okada | G06K 9/0002 257/433 |
| 7,236,616 | B1 * | 6/2007 | Scott | G06K 9/0002 361/280 |
| 2002/0114934 | A1 * | 8/2002 | Liu | C08F 2/44 428/212 |
| 2003/0076596 | A1 * | 4/2003 | Miyatake | G02B 1/11 359/601 |
| 2005/0130391 | A1 * | 6/2005 | Takayama | H01L 21/2007 438/458 |
| 2005/0192129 | A1 * | 9/2005 | Kuwabara | A63B 43/06 473/520 |
| 2011/0007027 | A1 * | 1/2011 | Chen | G06F 3/0416 345/174 |
| 2011/0199315 | A1 * | 8/2011 | Kent | G06F 3/0416 345/173 |
| 2011/0267298 | A1 * | 11/2011 | Erhart | G06F 1/1626 345/173 |
| 2012/0105081 | A1 * | 5/2012 | Shaikh | G06K 9/0002 324/686 |
| 2012/0242635 | A1 * | 9/2012 | Erhart | G06F 1/1626 345/207 |
| 2013/0265137 | A1 * | 10/2013 | Nelson | G06K 9/0002 340/5.82 |
| 2014/0299365 | A1 * | 10/2014 | Sebastian | G06F 3/044 174/255 |
| 2015/0153875 | A1 * | 6/2015 | Zhang | G06F 3/044 345/174 |
| 2016/0103505 | A1 * | 4/2016 | Fukumoto | G06F 3/03547 345/161 |
| 2016/0247009 | A1 * | 8/2016 | Lu | G06K 9/00 |

* cited by examiner

ACOUSTIC WAVE FINGERPRINT RECOGNITION UNIT AND METHOD FOR MANUFACTURING THEREOF

BACKGROUND

This application claims priority to Chinese Application Serial Number 201410766656.4, filed Dec. 11, 2014, which is incorporated herein by reference.

Field of Invention

The present disclosure relates to a fingerprint recognition unit. More particularly, the present disclosure relates to an acoustic wave fingerprint recognition unit.

Description of Related Art

A general fingerprint recognition unit, in view of sensing techniques, may be classified as pressure-type, capacitive type, optical type and acoustic type. The general fingerprint recognition unit mainly includes a microcontroller and a sensor that can be an optical lens, a pressure sensor or a three-dimensional image sensor.

Concerning the general fingerprint recognition unit and a method for manufacturing thereof, a specific adhesive agent is applied to mount different materials or structures. Generally, because the viscosity of the adhesive agent is high (>5,000 cp) but it curing time is very short, the packaging process now can be only manually coated in a small production instead of an automatical mass production. Accordingly, there is a need for an improved acoustic wave fingerprint recognition unit and a manufacturing method thereof to solve the aforementioned problems met in the art.

SUMMARY

Because the viscosity of the adhesive agent is high (>5,000 cp) and the curing time thereof is very short, the packaging process is currently manually coated in a small production but not in an automatical mass production. The present disclosure provides a novel acoustic wave fingerprint recognition unit and a manufacturing method thereof to solve the aforementioned problems in the art.

An embodiment of the present disclosure is provided an acoustic wave fingerprint recognition unit including a sensor circuit substrate, a film adhesive layer, a piezoelectric material layer and a protection layer.

The film adhesive layer is positioned on the sensor circuit substrate. The film adhesive layer is formed of a film adhesive material, and the film adhesive material is composed of a film adhesive agent and an organic solvent. Further, the film adhesive agent is an epoxy resin, and the organic solvent is a C3-C8 and carbonyl-containing organic solvent. According to various embodiments of the present disclosure, a solid content of the film adhesive agent in the film adhesive material is in a range of 1%-90%.

The piezoelectric material layer is positioned on the film adhesive layer, so as to be fixed on the sensor circuit substrate. The protection layer is positioned on the piezoelectric material layer.

According to various embodiments of the present disclosure, the piezoelectric material layer includes a polyvinylidene fluoride (PVDF) layer and a silver-containing polyurethane (Ag-containing PU) layer, the PVDF layer is disposed on the film adhesive layer, and the Ag-containing PU layer is disposed on the PVDF layer.

According to various embodiments of the present disclosure, the sensor circuit substrate includes a thin film t transistor (TFT) array substrate.

According to various embodiments of the present disclosure, the C3-C8 and carbonyl-containing organic solvent includes acetone, cyclohexanone, ethyl acetate or a combination thereof.

According to various embodiments of the present disclosure, a viscosity of the film adhesive layer is in a range of 10-6,000 cp.

According to various embodiments of the present disclosure, a thickness of the film adhesive layer is in a range of 1.9-2.1 μm.

According to various embodiments of the present disclosure, an acoustic impedance of the film adhesive layer is in a range of $1.5 \times 10^6$-$4.0 \times 10^6$ Mega Rayl.

According to various embodiments of the present disclosure, the film adhesive layer further includes a stabilizer mixed with the film adhesive agent and the organic solvent.

According to various embodiments of the present disclosure, the stabilizer includes a benzophenone-based compound, an acrylic monomer or a combination thereof.

According to various embodiments of the present disclosure, a material of the protection layer includes polymethyl methacrylate.

Another embodiment of the present disclosure is provided a method for manufacturing an acoustic wave fingerprint recognition unit. The method includes the following steps.

A film adhesive material layer is formed on a sensor circuit substrate. Further, the step of forming the film adhesive material layer includes preparing a film adhesive solution; and coating the film adhesive solution on the sensor circuit substrate to form the film adhesive material layer.

In the step of preparing the film adhesive solution, the film adhesive solution is composed of a film adhesive agent and an organic solvent. According to various embodiments of the present disclosure, the film adhesive agent is an epoxy resin, and the organic solvent is a C3-C8 and carbonyl-containing organic solvent. According to various embodiments of the present disclosure, a solid content of the film adhesive agent in the film adhesive material is in a range of 1%-90%.

In addition, a piezoelectric material layer is formed on the film adhesive material layer. The film adhesive material layer is cured to form a film adhesive layer, so as to fix the piezoelectric material layer on the sensor circuit substrate. A protection layer is formed on the piezoelectric material layer.

According to various embodiments of the present disclosure, the sensor circuit substrate includes a thin film t transistor (TFT) array substrate.

According to various embodiments of the present disclosure, the step of coating the film adhesive solution is performed by a spraying method, a spin-coating method, a scraper-coating method or a roll-to-roll coating method to coat the film adhesive solution on the sensor circuit substrate.

According to various embodiments of the present disclosure, forming the piezoelectric material layer includes forming a polyvinylidene fluoride (PVDF) layer and forming a silver-containing polyurethane (Ag-containing PU) layer. According to various embodiments of the present disclosure, the PVDF layer is formed on the film adhesive material layer. According to various embodiments of the present disclosure, the Ag-containing PU layer is formed on the PVDF layer.

According to various embodiments of the present disclosure, the C3-C8 and carbonyl-containing organic solvent includes acetone, cyclohexanone, ethyl acetate or a combination thereof.

According to various embodiments of the present disclosure, a viscosity of the film adhesive material layer is in a range of 10-6,000 cp.

According to various embodiments of the present disclosure, curing the film adhesive material layer includes removing the organic solvent in the film adhesive material layer.

According to various embodiments of the present disclosure, after removing the organic solvent in the film adhesive material layer, a thickness of the film adhesive layer is in a range of 1.9-2.1 μm.

According to various embodiments of the present disclosure, a thickness of the film adhesive material layer is 1.1-100 times of a thickness of the film adhesive layer.

According to various embodiments of the present disclosure, curing the film adhesive material layer is performed by a vacuum-drying method or a heating method to remove the organic solvent in the film adhesive material layer, so as to form the film adhesive layer.

According to various embodiments of the present disclosure, a viscosity of the film adhesive layer is 70%-100% of a viscosity of the film adhesive material layer.

According to various embodiments of the present disclosure, preparing the film adhesive solution further includes adding a stabilizer to mix with the film adhesive agent and the organic solvent.

According to various embodiments of the present disclosure, the stabilizer includes a benzophenone-based compound, an acrylic monomer or a combination thereof.

According to various embodiments of the present disclosure, forming the protection layer is forming a polymethyl methacrylate layer on the piezoelectric material layer.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

Because the viscosity of the adhesive agent is too high (>5,000 cp) and the curing time thereof is too short, the packaging process is currently performed by a handmade coating method to provide a small production, which is not able to give an automatically mass production. An acoustic wave fingerprint recognition unit and a manufacturing method thereof provided by the present disclosure is provided, in which a lower viscosity adhesive agent is prepared, so as to prolong a curing time during the fabricating process, and increase an uniformity of the film adhesive layer.

Figure 1:
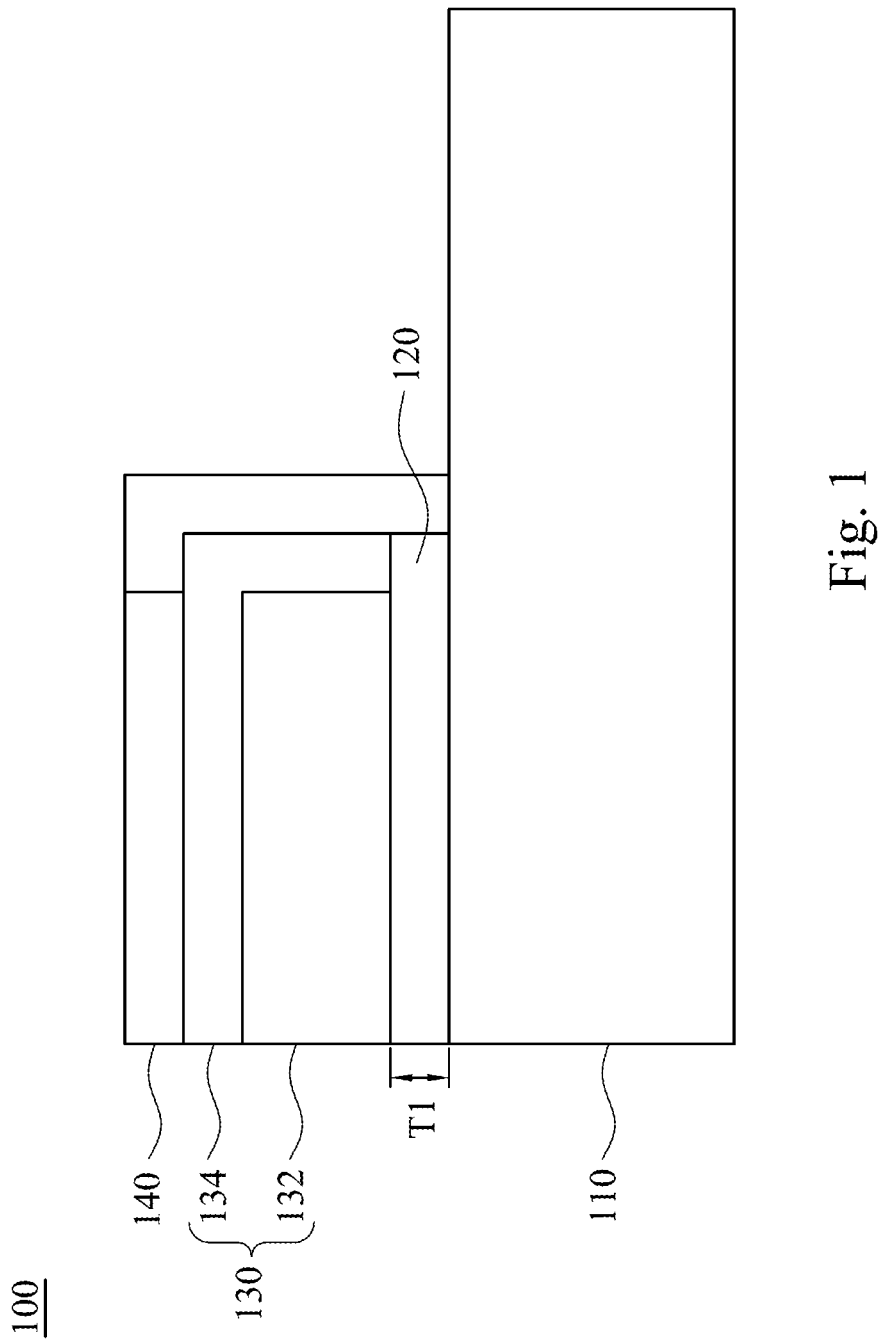
FIG. 1 is a schematic cross-sectional view of an acoustic wave fingerprint recognition unit according to various embodiments of the present disclosure.

FIG. 1 is a schematic cross-sectional view of an acoustic wave fingerprint recognition unit 100 according to various embodiments of the present disclosure. In FIG. 1, the acoustic wave fingerprint recognition unit 100 includes a sensor circuit substrate 110, a film adhesive layer 120, a piezoelectric material layer 130 and a protection layer 140.

The film adhesive layer 120 is positioned on the sensor circuit substrate 110. According to various embodiments of the present disclosure, the sensor circuit substrate 110 may be a thin film t transistor (TFT) array substrate.

The film adhesive layer 120 is formed of a film adhesive material, and the film adhesive material is composed of a film adhesive agent and an organic solvent. According to various embodiments of the present disclosure, the film adhesive agent is an epoxy resin, and the organic solvent is a C3-C8 and carbonyl-containing organic solvent. According to various embodiments of the present disclosure, the C3-C8 and carbonyl-containing organic solvent includes acetone, cyclohexanone, ethyl acetate or a combination thereof. According to various embodiments of the present disclosure, a solid content of the film adhesive agent in the film adhesive material is in a range of 1%-90%.

According to various embodiments of the present disclosure, a viscosity of the film adhesive layer 120 is in a range of 10-6,000 cp. According to various embodiments of the present disclosure, a thickness of the film adhesive layer 120 is in a range of 1.9-2.1 μm. According to various embodiments of the present disclosure, an acoustic impedance of the film adhesive layer 120 is in a range of $1.5 \times 10^6$-$4.0 \times 10^6$ Mega Rayl.

According to various embodiments of the present disclosure, the film adhesive layer 120 further includes a stabilizer mixed with the film adhesive agent and the organic solvent. According to various embodiments of the present disclosure, the stabilizer includes a benzophenone-based compound, an acrylic monomer or a combination thereof. According to various embodiments of the present disclosure, a weight percentage of the stabilizer in the film adhesive material is in a range of 1 wt %-50 wt %.

The piezoelectric material layer 130 is positioned on the film adhesive layer 120, so as to be fixed on the sensor circuit substrate 110. According to various embodiments of the present disclosure, the piezoelectric material layer 130 includes a polyvinylidene fluoride (PVDF) layer 132 and a silver-containing polyurethane (Ag-containing PU) layer 134. According to various embodiments of the present disclosure, the PVDF layer 132 is disposed on the film adhesive layer 120, and the Ag-containing PU layer 134 is disposed on the PVDF layer 132.

The protection layer 140 is positioned on the piezoelectric material layer 130. According to various embodiments of the present disclosure, a material of the protection layer 140 includes polymethyl methacrylate.

FIGS. 2A-2D are schematic cross-sectional views at various stages of fabricating an acoustic wave fingerprint recognition unit 200 according various embodiments of the present disclosure.

Figure 2A:
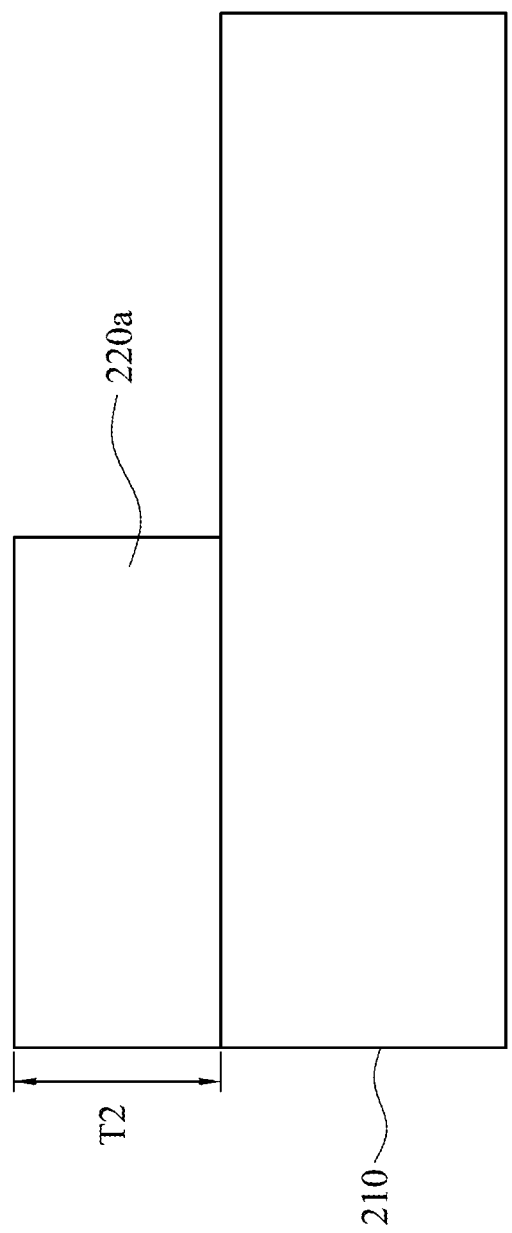
FIGS. 2A-2D are schematic cross-sectional views at various stages of fabricating an acoustic wave fingerprint recognition unit according various embodiments of the present disclosure.

In FIG. 2A, a film adhesive material layer 220a is formed on a sensor circuit substrate 210. According to various embodiments of the present disclosure, the sensor circuit substrate 210 includes a thin film t transistor (TFT) array substrate. According to various embodiments of the present disclosure, a thickness of the film adhesive material layer 220a is T2. According to various embodiments of the present disclosure, a viscosity of the film adhesive material layer 220a is in a range of 10-6,000 cp.

According to various embodiments of the present disclosure, the step of forming the film adhesive material layer 220a includes preparing a film adhesive solution; and coating the film adhesive solution on the sensor circuit substrate 210 to form the film adhesive material layer 220a.

In the step of preparing the film adhesive solution, the film adhesive solution is composed of a film adhesive agent and an organic solvent. According to various embodiments of the present disclosure, the film adhesive agent is an epoxy resin, and the organic solvent is a C3-C8 and carbonyl-containing organic solvent. According to various embodiments of the present disclosure, the C3-C8 and carbonyl-containing organic solvent includes acetone, cyclohexanone, ethyl acetate or a combination thereof. According to various embodiments of the present disclosure, a solid content of the film adhesive agent in the film adhesive material is in a range of 1%-90%.

According to various embodiments of the present disclosure, preparing the film adhesive solution further includes adding a stabilizer to mix with the film adhesive agent and the organic solvent. According to various embodiments of the present disclosure, the stabilizer includes a benzophenone-based compound, an acrylic monomer or a combination thereof. According to various embodiments of the present disclosure, a weight percentage of the stabilizer in the film adhesive material is in a range of 1 wt %-50 wt %.

According to various embodiments of the present disclosure, the step of coating the film adhesive solution is performed by a spraying method, a spin-coating method, a scraper-coating method or a roll-to-roll coating method to coat the film adhesive solution on the sensor circuit substrate 210.

Figure 2B:
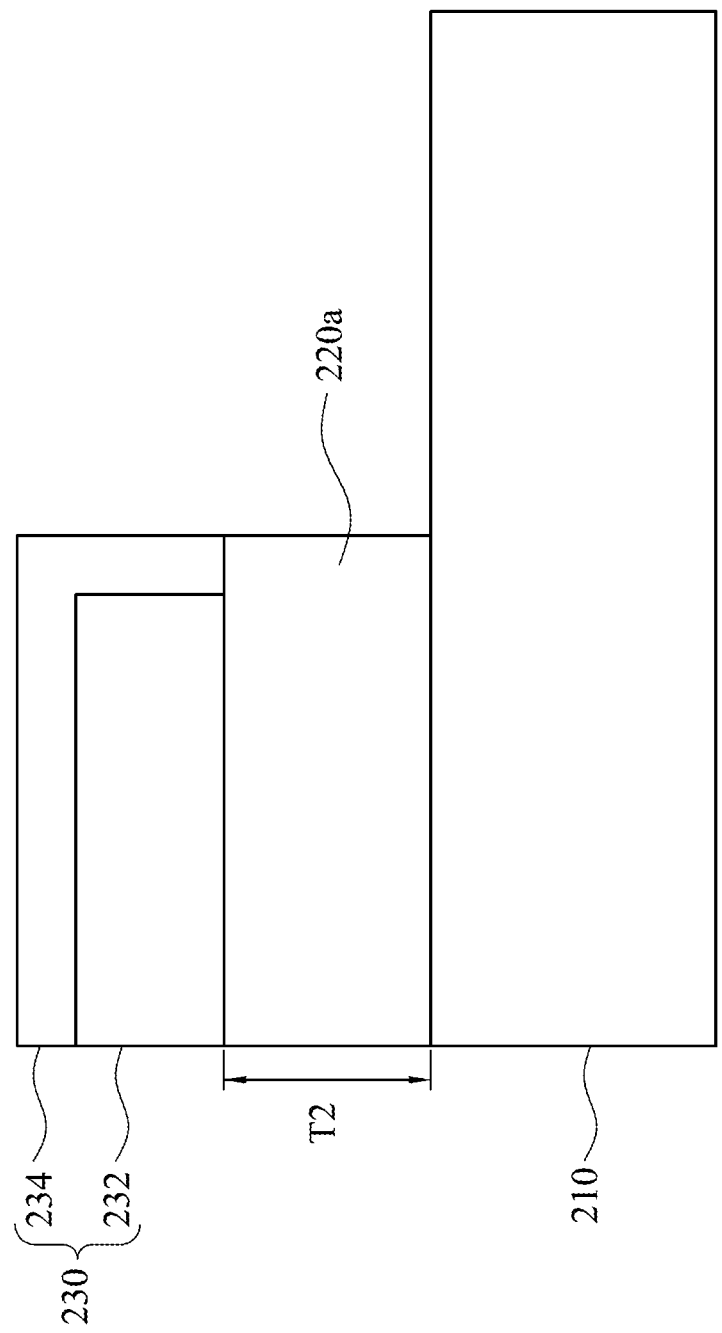

In addition, in FIG. 2B, a piezoelectric material layer 230 is formed on the film adhesive material layer 220a. According to various embodiments of the present disclosure, forming the piezoelectric material layer 230 includes forming a polyvinylidene fluoride (PVDF) layer 232 and forming a silver-containing polyurethane (Ag-containing PU) layer 234. According to various embodiments of the present disclosure, the PVDF layer 232 is formed on the film adhesive material layer 220a. According to various embodiments of the present disclosure, the Ag-containing PU layer 234 is formed on the PVDF layer 232.

Figure 2C:
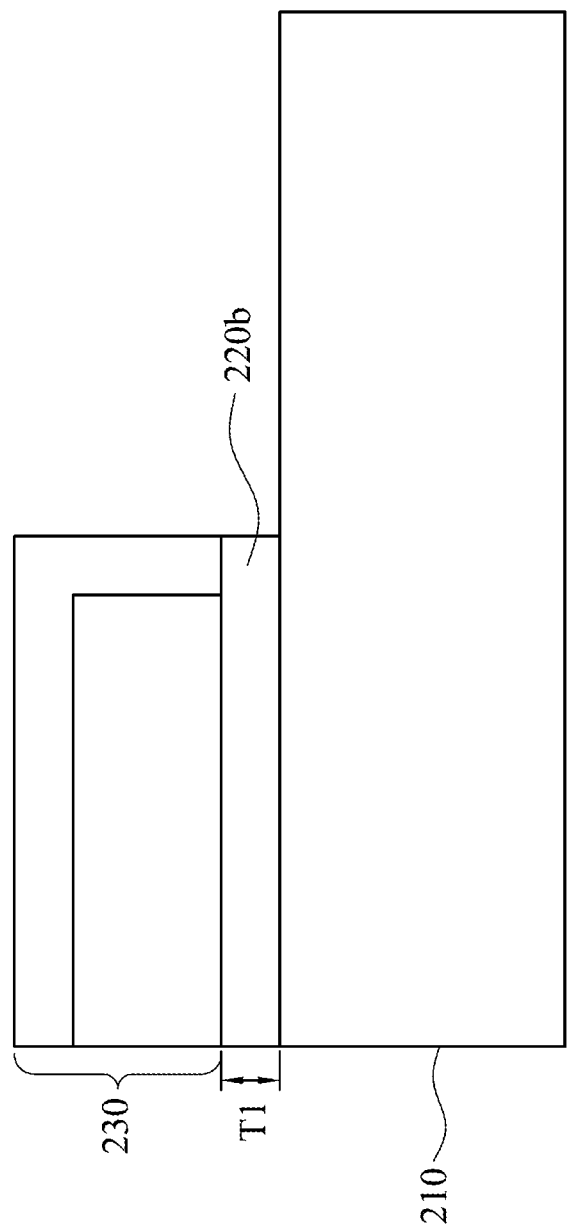

In FIG. 2C, the film adhesive material layer 220a is cured to form a film adhesive layer 220b, so as to fix the piezoelectric material layer 230 on the sensor circuit substrate 210. According to various embodiments of the present disclosure, curing the film adhesive material layer 220a includes removing the organic solvent in the film adhesive material layer 220a. According to various embodiments of the present disclosure, curing the film adhesive material layer 220a is performed by a vacuum-drying method or a heating method to remove the organic solvent in the film adhesive material layer 220a, so as to form the film adhesive layer 220b.

According to various embodiments of the present disclosure, after removing the organic solvent in the film adhesive material layer 220a, a thickness (T1) of the film adhesive layer 220b is in a range of 1.9-2.1 μm. According to various embodiments of the present disclosure, a thickness (T2) of the film adhesive material layer 220a is 1.1-100 times of a thickness (T1) of the film adhesive layer 220b.

According to various embodiments of the present disclosure, after removing the organic solvent in the film adhesive material layer 220a, a viscosity of the film adhesive layer 220b is 70%-100% of a viscosity of the film adhesive material layer 220a.

Figure 2D:
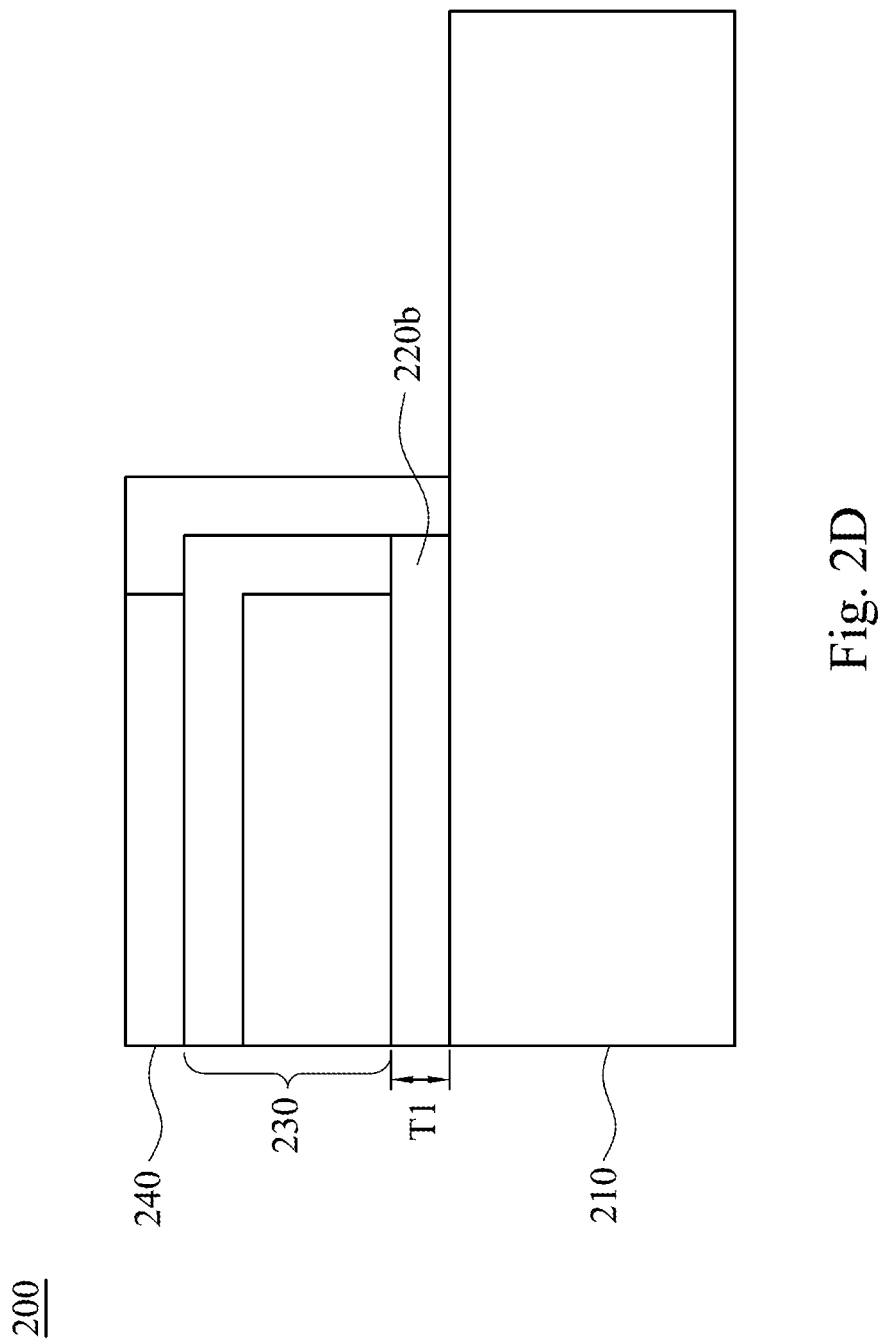

Further, in FIG. 2D, a protection layer 240 is formed on the piezoelectric material layer 230. According to various embodiments of the present disclosure, forming the protection layer 240 is forming a polymethyl methacrylate layer on the piezoelectric material layer 230.

Figure 3:
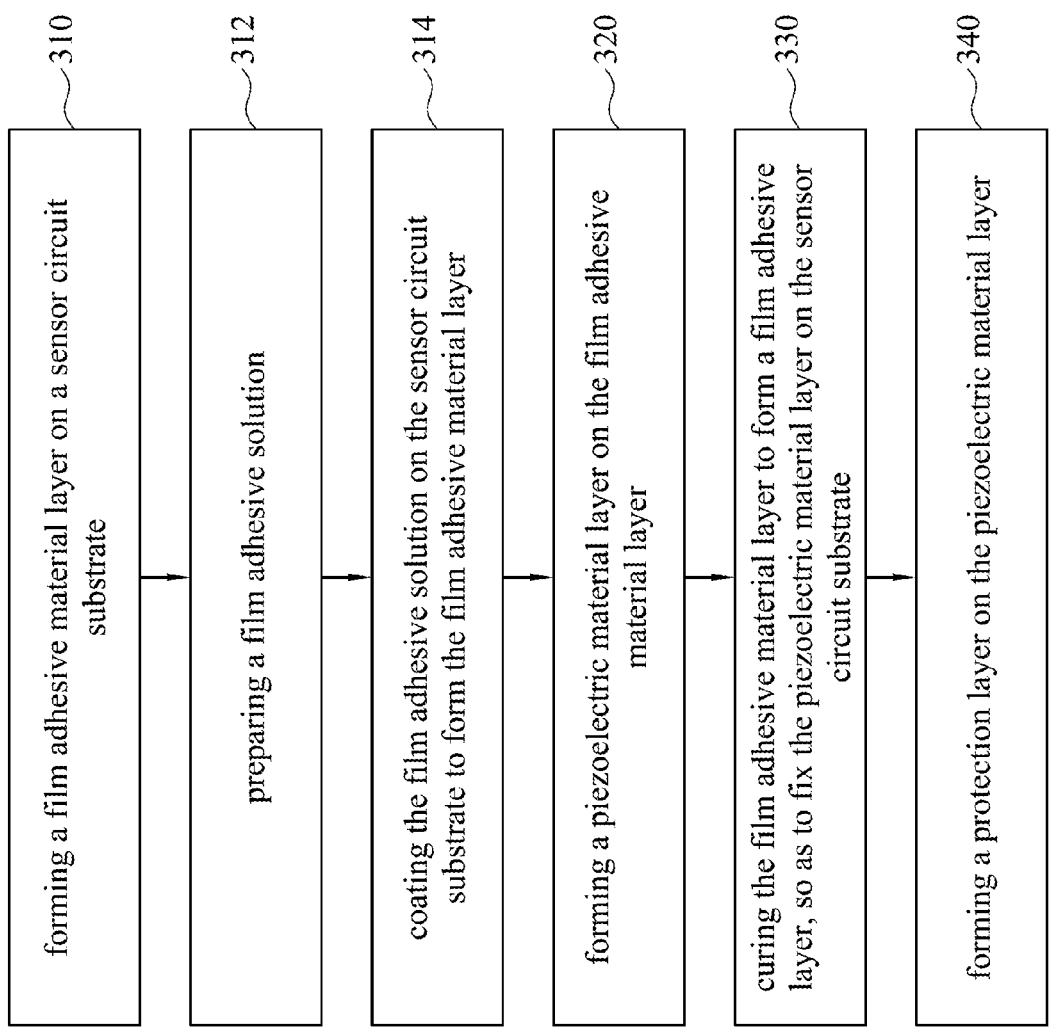
FIG. 3 is a flow chart illustrating a method for manufacturing an acoustic wave fingerprint recognition unit according various embodiments of the present disclosure.

FIG. 3 is a flow chart illustrating a method for manufacturing an acoustic wave fingerprint recognition unit according various embodiments of the present disclosure. FIG. 3 includes steps 310, 312, 314, 320, 330 and 340. These steps are disclosed in association with the cross-sectional views of the acoustic wave fingerprint recognition unit 200 from FIGS. 2A to 2D at various fabrication stages.

In step 310, a film adhesive material layer 220a is formed on a sensor circuit substrate 210. According to various embodiments of the present disclosure, the sensor circuit substrate 210 includes a thin film t transistor (TFT) array substrate.

Step 310 includes step 312 and step 314. In step 312, the film adhesive solution is prepared. The film adhesive solution is composed of a film adhesive agent and an organic solvent. According to various embodiments of the present disclosure, a solid content of the film adhesive agent in the film adhesive material is in a range of 1%-90%.

In addition, in step 314, the film adhesive solution is coated on the sensor circuit substrate 210 to form the film adhesive material layer 220a.

In step 320, a piezoelectric material layer 230 is formed on the film adhesive material layer 220a. In addition, in step 330, the film adhesive material layer 220a is cured to form a film adhesive layer 220b, so as to fix the piezoelectric material layer 230 on the sensor circuit substrate 210. In step 340, a protection layer 240 is formed on the piezoelectric material layer 230.

To solve the aforementioned problems met in the art, the acoustic wave fingerprint recognition unit and a manufacturing method thereof according to the present disclosure are provided to prepare the film adhesive solution by mixing the proper organic solvent and the film adhesive agent. Because of the natural chemical properties of the film adhesive agent, the solid content of the film adhesive agent in the film adhesive solution may be calculated to give the best process condition.

On another aspect, by the preparation process of the film adhesive solution, the film adhesive solution with the lower viscosity is provided to increase the variety of the process method. Further, the concentration of the film adhesive agent in the film adhesive solution is low, so that the curing time of the fabricating process may be prolonged and the uniformity of the film adhesive layer may be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for manufacturing an acoustic wave fingerprint recognition unit, comprising:
    forming a film adhesive material layer on a sensor circuit substrate, wherein forming the film adhesive material layer comprises:
        preparing a film adhesive solution, wherein the film adhesive solution is composed of a film adhesive agent and an organic solvent, wherein the film adhesive agent is an epoxy resin, the organic solvent is a C3-C8 and carbonyl-containing organic solvent, and a solid content of the film adhesive agent in the film adhesive material is in a range of 1%-90%; and
        coating the film adhesive solution on the sensor circuit substrate to form the film adhesive material layer, wherein a viscosity of the film adhesive material layer is in a range of 10-6,000 cp;
    forming a piezoelectric material layer on the film adhesive material layer;
    curing the film adhesive material layer to form a film adhesive layer, so as to fix the piezoelectric material layer on the sensor circuit substrate; and
    forming a protection layer on the piezoelectric material layer.

2. The method of claim 1, wherein the sensor circuit substrate comprises a thin film transistor (TFT) array substrate.

3. The method of claim 1, wherein the step of coating the film adhesive solution is performed by a spraying method, a spin-coating method, a scraper-coating method or a roll-to-roll coating method to coat the film adhesive solution on the sensor circuit substrate.

4. The method of claim 1, wherein forming the piezoelectric material layer comprises forming a polyvinylidene fluoride (PVDF) layer and forming a silver-containing polyurethane (Ag-containing PU) layer, the PVDF layer is formed on the film adhesive material layer, and the Ag-containing PU layer is formed on the PVDF layer.

5. The method of claim 1, wherein the C3-C8 and carbonyl-containing organic solvent comprises acetone, cyclohexanone, ethyl acetate or a combination thereof.

6. The method of claim 1, wherein curing the film adhesive material layer comprises removing the organic solvent in the film adhesive material layer.

7. The method of claim 6, after removing the organic solvent in the film adhesive material layer, a thickness of the film adhesive layer in a range of 1.9-21 μm.

8. The method of claim 7, wherein a thickness of the film adhesive material layer is 1.1-100 times of a thickness of the film adhesive layer.

9. The method of claim 1, wherein curing the film adhesive material layer is performed by a vacuum-drying method or a heating method to remove the organic solvent in the film adhesive material layer, so as to form the film adhesive layer.

10. The method of claim 9, wherein a viscosity of the film adhesive layer is 70%-100% of the viscosity of the film adhesive material layer.

11. The method of claim 1, wherein preparing the film adhesive solution further comprises adding a stabilizer to mix with the film adhesive agent and the organic solvent.

12. The method of claim 11, wherein the stabilizer comprises a benzophenone-based compound an acrylic monomer or a combination thereof.

13. The method of claim 1, wherein forming the protection layer is forming a polymethyl methacrylate layer on the piezoelectric material layer.

* * * * *